United States Patent
Glazko et al.

(10) Patent No.: US 7,986,922 B2
(45) Date of Patent: Jul. 26, 2011

(54) JAMMER DETECTION AND SUPPRESSION FOR WIRELESS COMMUNICATION

(75) Inventors: Serguei A. Glazko, San Diego, CA (US); James Edward Beckman, La Jolla, CA (US); Shimman Patel, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 731 days.

(21) Appl. No.: 11/739,971

(22) Filed: Apr. 25, 2007

(65) Prior Publication Data

US 2008/0143580 A1   Jun. 19, 2008

Related U.S. Application Data

(60) Provisional application No. 60/870,236, filed on Dec. 15, 2006, provisional application No. 60/885,370, filed on Jan. 17, 2007.

(51) Int. Cl.
   *H07Q 7/20*   (2006.01)
(52) U.S. Cl. ............... 455/100; 455/67.11; 455/500; 455/517; 455/423; 370/241.1; 370/242; 370/243; 370/310; 370/328; 375/285; 375/130; 375/144
(58) Field of Classification Search ........... 455/100, 455/1, 67.11, 500, 517, 426.1, 426.2, 422.01, 455/403, 445, 550.1, 552.1, 553.1, 423–425; 342/357.02, 357.01; 375/285, 130, 144; 370/241, 241.1, 242–245, 310, 328, 343, 370/251, 252
See application file for complete search history.

(56) References Cited

U.S. PATENT DOCUMENTS

| 5,519,890 A | 5/1996 | Pinckley |
| 5,758,275 A | 5/1998 | Cox et al. |
| 5,822,429 A * | 10/1998 | Casabona et al. ............ 380/252 |

(Continued)

FOREIGN PATENT DOCUMENTS

EP   0987829 A2   3/2000

(Continued)

OTHER PUBLICATIONS

International Search Report and Written Opinion - PCT/US2007/087792, International Search Authority - European Patent Office - Mar. 18, 2009 (060769).

*Primary Examiner* — Keith T Ferguson
(74) *Attorney, Agent, or Firm* — Donald C. Kordich; Sayed H. Beladi (57) ABSTRACT

Techniques for detecting and suppressing jammers are described. A receiver may perform post-FFT jammer detection and pre-FFT jammer suppression. The receiver may transform an input signal to obtain a frequency-domain signal and may detect for jammers in the input signal based on the frequency-domain signal. The receiver may determine powers of a plurality of carriers based on the frequency-domain signal and may detect for jammers based on peaks in the powers of these carriers. The receiver may filter the input signal (e.g., with a notch filter) to suppress the detected jammers. Alternatively or additionally, the receiver may perform post-FFT jammer detection and post-FFT jammer suppression. The receiver may determine whether jammer is present on each carrier based on data power and channel power for that carrier. The receiver may modify (e.g., zero out or reduce) the frequency-domain signal on carriers with detected jammers.

33 Claims, 6 Drawing Sheets

U.S. PATENT DOCUMENTS

| | | | |
|---|---|---|---|
| 5,999,559 A * | 12/1999 | Takaki | 375/130 |
| 6,122,309 A * | 9/2000 | Bergstrom et al. | 375/130 |
| 2002/0087199 A1 | 7/2002 | Bange et al. | |
| 2003/0235254 A1 | 12/2003 | Fanson et al. | |
| 2004/0062216 A1 | 4/2004 | Nicholls et al. | |
| 2005/0047486 A1 | 3/2005 | Sakaue et al. | |
| 2005/0285781 A1 * | 12/2005 | Park et al. | 342/357.02 |
| 2007/0076813 A1 * | 4/2007 | Haartsen | 375/285 |

FOREIGN PATENT DOCUMENTS

| | | |
|---|---|---|
| WO | WO2004114617 | 12/2004 |
| WO | WO2006060605 A2 | 6/2006 |
| WO | WO2007099413 | 9/2007 |
| WO | WO07120939 | 10/2007 |

* cited by examiner

JAMMER DETECTION AND SUPPRESSION FOR WIRELESS COMMUNICATION

The present Application for Patent claims priority to Provisional Application No. 60/870,236 entitled "JAMMER FOR BROADCAST OFDM" filed Dec. 15, 2006, this application also claims priority to Provisional Application No. 60/885,370, entitled "JAMMER DETECTION AND REMOVAL TECHNIQUES" filed Jan. 17, 2007 and assigned to the assignee hereof and hereby expressly incorporated by reference herein.

BACKGROUND

1. Field

The present disclosure relates generally to communication, and more specifically to techniques for detecting and suppressing jammers.

2. Background

Wireless communication systems are widely deployed to provide various communication services such as broadcast, voice, video, packet data, messaging, etc. These wireless systems include broadcast systems, cellular systems, etc. A wireless system may operate in an environment where jammers may be present. Jammers are large amplitude undesired signals within the same frequency channel as a desired signal. The jammers may correspond to strong narrowband frequency components (e.g., for color carrier, sound carrier, etc.) from an interfering source or intermodulation distortion generated by a receiver. The jammers may cause various deleterious effects such as failure to detect and acquire a signal from a desired system, degradation in decoding performance, etc.

There is therefore a need in the art for techniques to detect and mitigate jammers.

SUMMARY

Techniques for detecting and suppressing jammers are described herein. A receiver may detect for jammers by transforming a time-domain input signal to the frequency domain with a fast Fourier transform (FFT) and detecting for jammers based on the frequency-domain signal. Detection for jammers in the frequency domain is referred to as post-FFT jammer detection. The receiver may suppress detected jammers by (i) filtering the input signal, which is referred to as pre-FFT jammer suppression, and/or (ii) modifying the frequency-domain signal, which is referred to as post-FFT jammer suppression.

In one aspect, the receiver may perform post-FFT jammer detection and pre-FFT jammer suppression. The receiver may transform the input signal (e.g., with FFT) to obtain the frequency-domain signal and may detect for jammers in the input signal based on the frequency-domain signal. The receiver may determine powers of a plurality of carriers based on the frequency-domain signal and may detect for jammers based on peaks in the powers of these carriers. The receiver may filter the input signal (e.g., with a notch filter) to suppress the detected jammers. The receiver may perform jammer detection prior to each time-sliced data burst to be demodulated and may perform jammer suppression during the data burst.

In another aspect, the receiver may perform post-FFT jammer detection and post-FFT jammer suppression. The receiver may determine data power and channel power for each of the plurality of carriers and may declare jammer on each carrier in which the data power is sufficiently larger than the channel power. The receiver may modify (e.g., zero out or reduce) the frequency-domain signal on carriers with detected jammers.

Various aspects and features of the disclosure are described in further detail below.

DETAILED DESCRIPTION

The techniques described herein may be used for various wireless communication systems and networks such as broadcast systems, cellular systems, wireless wide area networks (WWANs), wireless metropolitan area networks (WMANs), wireless local area networks (WLANs), etc. The terms "system" and "network" are often used interchangeably. These systems and networks may utilize orthogonal frequency division multiplexing (OFDM), single-carrier frequency division multiplexing (SC-FDM), or some other multiplexing schemes. OFDM and SC-FDM partition the system bandwidth into multiple orthogonal carriers, which may also be referred to as subcarriers, tones, bins, etc. Each carrier may be modulated with data. In general, modulation symbols are sent in the frequency domain with OFDM and in the time domain with SC-FDM.

The techniques may be used for systems that implement radio technologies such as Long Term Evolution (LTE) defined by an organization named "3rd Generation Partnership Project" (3GPP), Flash-OFDM® from Flarion Technologies, Ultra Mobile Broadband (UMB) from Qualcomm Incorporated, IEEE 802.11, IEEE 802.16 and IEEE 802.20 from The Institute of Electrical and Electronics Engineers (IEEE), etc. IEEE 802.11 is commonly referred to as Wi-Fi, and IEEE 802.16 is commonly referred to as WiMAX. The techniques may also be used for broadcast systems that implement Digital Video Broadcasting for Handhelds (DVB-H), Integrated Services Digital Broadcasting for Terrestrial Television Broadcasting (ISDB-T), MediaFLO, etc. DVB-H, ISDB-T, and MediaFLO support digital transmission of multimedia over a terrestrial communication network. DVB-H is described in ETSI EN 300 304, entitled "Digital Video Broadcasting (DVB); Transmission System for Handheld Terminals (DVB-H)," and ETSI EN 300 744, entitled "Digital Video Broadcasting (DVB); Framing structure, channel coding and modulation for digital terrestrial television," both dated November 2004. ISDB-T is described in ARIB STD-B31, entitled "Transmission System for Digital Terrestrial Television Broadcasting," July 2003. These documents are publicly available. For clarity, certain aspects of the techniques are described below for broadcast systems.

Figure 1:
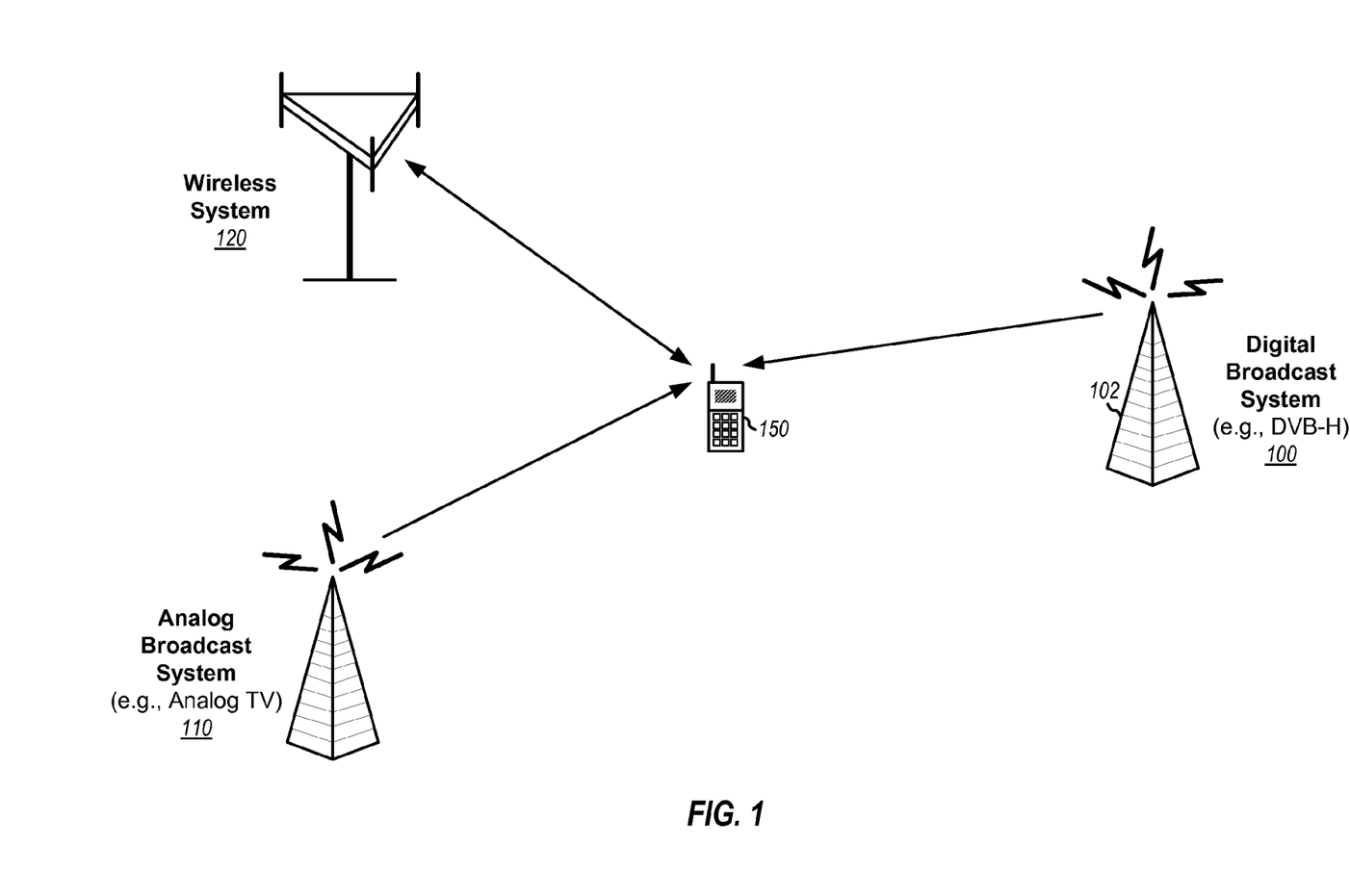
FIG. 1 shows a wireless device receiving signals from multiple systems.

FIG. 1 shows a wireless device 150 capable of receiving a signal from a digital broadcast system 100. Wireless device 150 may be a cellular phone, a personal digital assistant (PDA), a terminal, a wireless modem, a handheld device, a laptop computer, etc. Broadcast system 100 may implement DVB-H, ISDB-T, MediaFLO, etc. System 100 may include any number of broadcast stations. For simplicity, only one broadcast station 102 is shown in FIG. 1.

An analog broadcast system 110 and/or a wireless system 120 may also be deployed near the same geographic area as digital broadcast system 100. Broadcast system 110 may be an analog television (TV) broadcast system, a radio broadcast system, or some other analog terrestrial broadcast system. Wireless system 120 may be an analog cellular system or some other system. Systems 110 and/or 120 may transmit signals within or near a frequency channel used by broadcast system 100. The signals from systems 110 and/or 120 may have frequency components that may be much larger in amplitude than the signal from system 100 and may thus act as jammers to the signal from system 100.

Figure 2A:
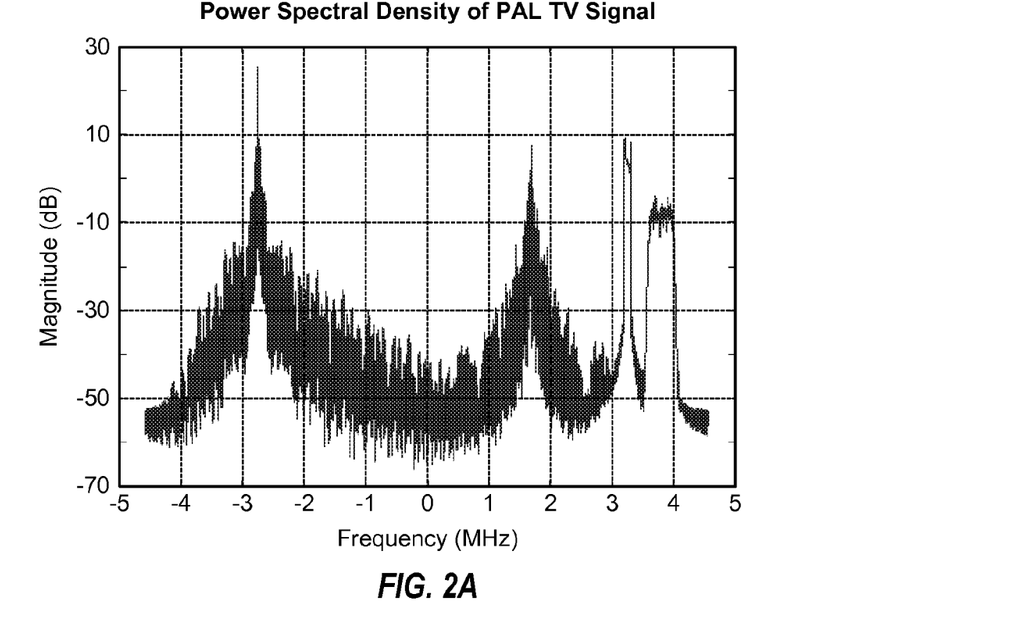
FIG. 2A shows a power spectral density (PSD) of an analog television (TV) signal.

FIG. 2A shows an example power spectral density (PSD) or spectrum of an analog TV signal that may be transmitted by analog broadcast system 110 in FIG. 1. The analog TV signal may be generated based on Phase Alternating Line (PAL), National Television System Committee (NTSC), or Sequential Color with Memory (SECAM). PAL, NTSC, and SECAM are analog video standards commonly used throughout the world. The PSD of the analog TV signal may have strong narrowband frequency components. In the example shown in FIG. 2A, the PSD is for a PAL TV signal and includes a strong peak near −2.8 MHz for a color/vision carrier, a strong peak near 1.7 MHz for a sound carrier, and a strong peak near 3.2 MHz for Near Instantaneous Companded Audio Multiplex (NICAM) digital audio. The power of the PAL TV signal may be concentrated in the color carrier, which may be 30 decibels (dB) or higher than much of the PSD for the PAL TV signal.

Figure 2B:
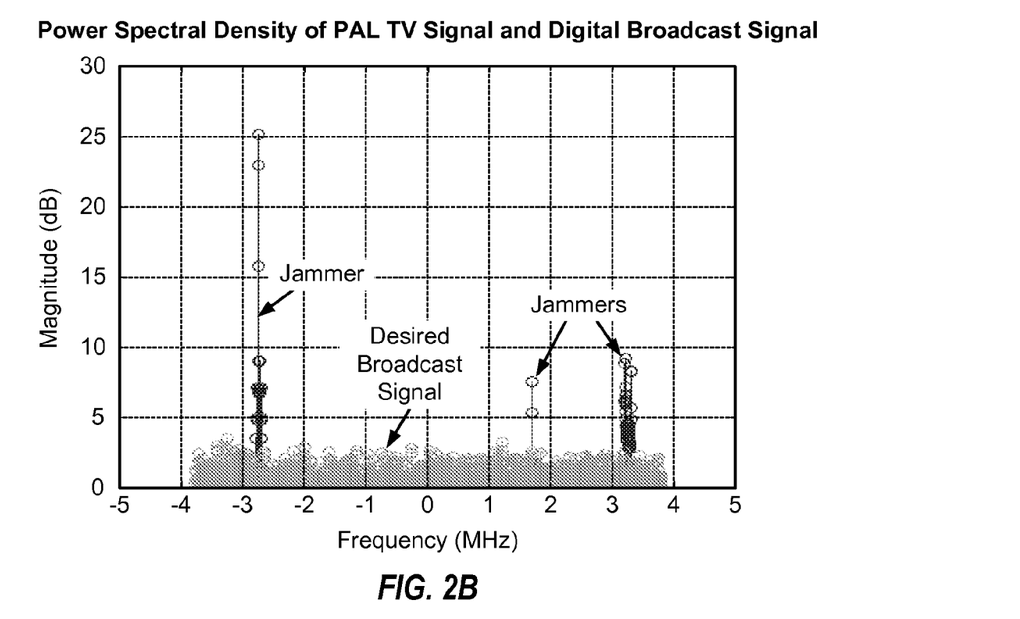
FIG. 2B shows a PSD of a digital broadcast signal and the analog TV signal.

FIG. 2B shows an example PSD of a digital broadcast signal from digital broadcast system 100 with an interfering PAL TV signal from analog broadcast system 110. The digital broadcast signal may have a relatively flat spectrum due to the manner in which the signal is generated. The narrowband peaks in the PAL TV signal may be much larger in amplitude and may act as jammers to the digital broadcast signal. FIG. 2B shows jammers from a single PAL TV signal. In general, jammers may come from any number of interfering sources/signals and may be located at any frequencies.

Jammers may degrade performance in several manners when receiving the digital broadcast signal from system 100. First, the jammers act as noise that may degrade decoding performance. This may result in higher bit error rate (BER), packet error rate (PER), frame error rate (FER), etc. Second, the jammers may hamper detection and acquisition of the digital broadcast signal and adversely impact synchronization performance. DVB-H, ISDB-T, and MediaFLO utilize OFDM. Each OFDM symbol includes a useful portion and a guard interval, which is a copy of a fraction of the useful portion. Many detection and acquisition schemes perform correlation between the guard interval and the corresponding useful portion in order to detect and acquire the digital broadcast signal. Guard-based correlation schemes are also commonly used for coarse time acquisition, coarse frequency acquisition, fine frequency tracking, etc. An analog TV signal typically contains a continuous wave (CW) for a color carrier that may be transmitted at up to 73% of the total signal power. The analog TV signal has a strong effect on the guard-based correlation schemes because the CW signal is highly correlated with a delayed version of itself. The analog TV signal may thus degrade the performance of the guard-based correlation schemes, possibly to the point of failure.

Jammers may be detected and suppressed based on the techniques described herein. In one aspect, jammers may be detected after performing an FFT or a discrete Fourier transform (DFT) on an input signal (or post-FFT), and the detected jammers may be suppressed by filtering the input signal prior to the FFT (or pre-FFT). In another aspect, jammers may be detected post-FFT, and the detected jammers may be suppressed post-FFT. For clarity, the techniques are described below for a broadcast system that implements DVB-H.

Figure 3A:
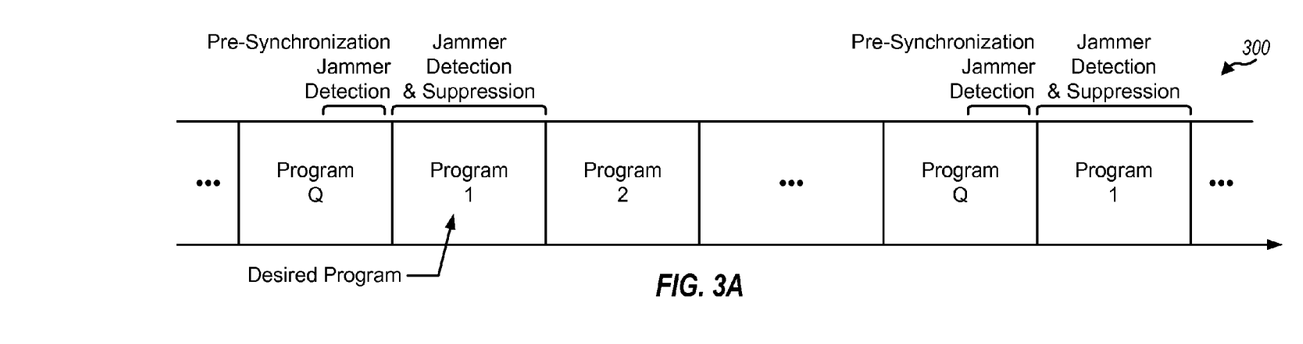
FIG. 3A shows a time slice structure supported by DVB-H.

FIG. 3A shows a time slice structure 300 supported by DVB-H. One or more (Q) programs may be sent in a DVB-H signal. Each program may be sent as data bursts in short time intervals. Each data burst may contain up to two megabits of data and parity and may also carry a delta time to the start of the next data burst for the same program. A DVB-H receiver may turn on for short periods of time to receive the data bursts for each program of interest and may turn off during the remaining time to reduce power consumption. For example, if ten programs are sent in equal time intervals, then the DVB-H receiver may receive one program in 10% of the time and may turn off and achieve power saving for up to 90% of the time. In general, the Q programs may be sent in any order within the DVB-H signal, each program may be sent at any rate, and each data burst may have any duration.

DVB-H supports three modes of operation for FFT sizes of 2K, 4K and 8K. Table 1 lists some parameters for DVB-H and provides their values for the three operating modes. In Table 1, parameters N, K, D and P are given for one OFDM symbol and are dependent on the operating mode. The carrier spacing in Table 1 is for 8 MHz channel. DVB-H may be configured for 5, 6, 7, or 8 MHz channel, each of which is associated with different carrier spacing.

TABLE 1

| Description | Notation | Mode | | |
| --- | --- | --- | --- | --- |
| | | 2K | 4K | 8K |
| Carrier spacing (in KHz) | | 4.4643 | 2.2321 | 1.1161 |
| FFT size | N | 2048 | 4096 | 8192 |
| Total number of carriers | K | 1705 | 3409 | 6817 |
| Number of data carriers | D | 1518 | 3036 | 6102 |
| Number of pilot carriers | P | 187 | 373 | 745 |

Figure 3B:
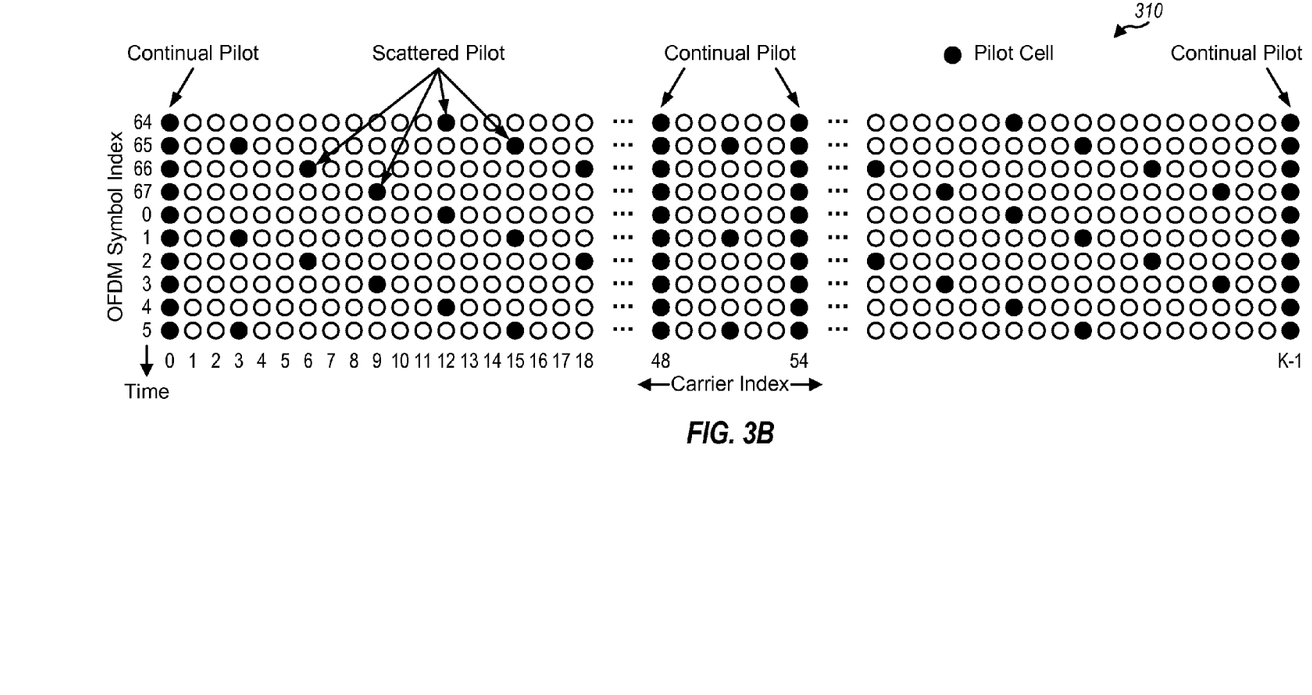
FIG. 3B shows a carrier structure for DVB-H.

FIG. 3B shows a carrier structure 310 for DVB-H. The overall system bandwidth of BW MHz is partitioned into multiple (K) carriers that are given indices of 0 through K−1, where K is dependent on the operating mode and given in Table 1. The spacing between carriers is BW/K MHz.

FIG. 3B also shows a pilot structure for DVB-H. A continual pilot is sent in each OFDM symbol period on C carriers that are distributed across the K total carriers, where C is dependent on the operating mode. These C carriers include carriers 0, 48, 54, etc., which are given in ETSI EN 300 744. A scattered pilot is sent on one of four interlaces in each OFDM symbol period. Each interlace contains approximately K/12 carriers that are uniformly spaced apart by 12 carriers. Interlace m, for m ∈{0,1,2, 3}, contains carriers 3m, 3m+12, 3m+24, etc.

The transmission timeline for DVB-H is partitioned into frames, with each frame including 68 OFDM symbols that are given indices of 0 through 67. The scattered pilot is sent on interlace m=(n mod 4) in OFDM symbol period n, for n=0, ..., 67, where "mod" denotes a modulo operation. The scattered pilot cycles through the four interlaces in each 4-symbol interval.

Figure 4:
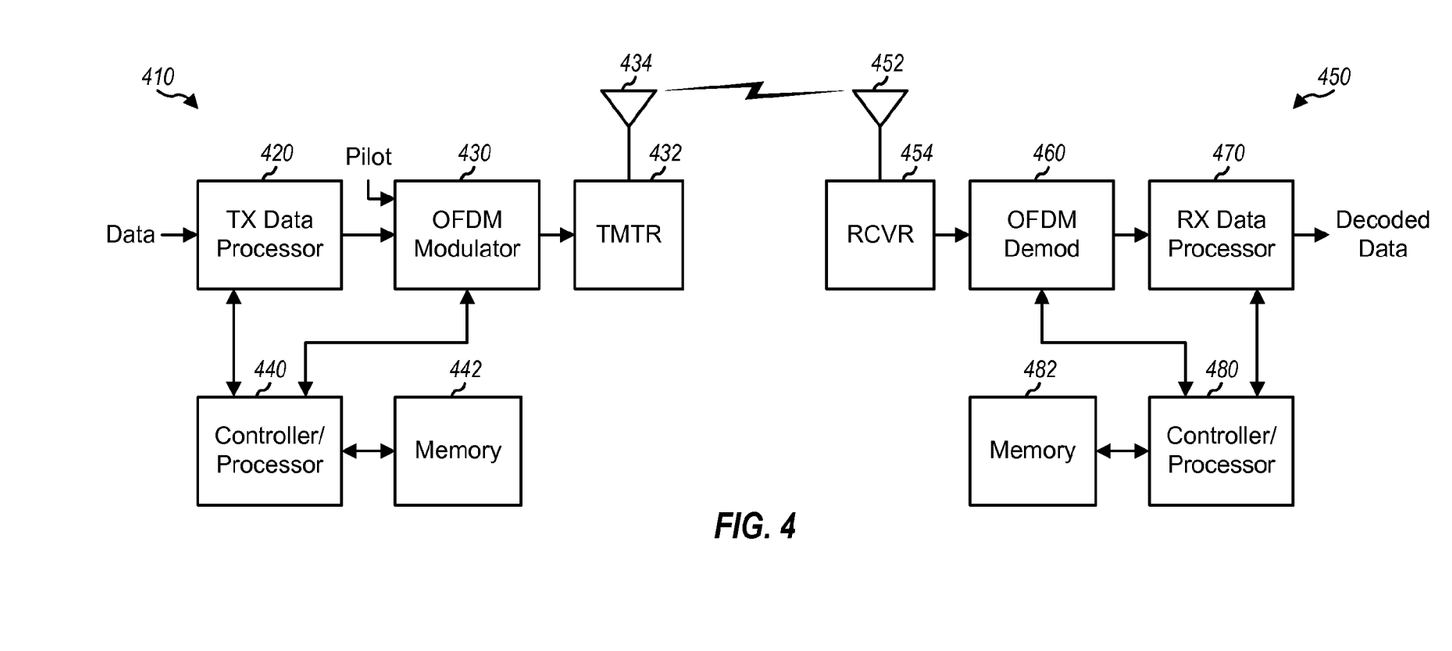
FIG. 4 shows a block diagram of a transmitter and a receiver.

FIG. 4 shows a block diagram of a transmitter 410 and a receiver 450 in a DVB-H broadcast system. Transmitter 410 may be part of broadcast station 102 in FIG. 1, and receiver 450 may be part of wireless device 150 in FIG. 1.

At transmitter 410, a transmit (TX) data processor 420 processes (e.g., formats, encodes, interleaves, and symbol maps) data and generates data symbols. As used herein, a data symbol is a symbol for data, a pilot symbol is a symbol for pilot, a zero symbol is a signal value of zero, and a symbol is typically a complex value. The data symbols and pilot symbols may be modulation symbols from a modulation scheme such as PSK or QAM. Pilot is data that is known a priori by both the transmitter and the receiver.

An OFDM modulator 430 receives the data and pilot symbols, maps the data symbols to data cells and maps the pilot symbols to pilot cells. A data cell is a cell used to send data, a pilot cell is a cell used to send pilot, and a cell is one carrier in one symbol period and may be used to send one modulation symbol. A given carrier may serve as a data cell in one OFDM symbol period and as a pilot cell in another OFDM symbol period. An OFDM symbol period is the duration of one OFDM symbol and is also referred to as a symbol period. OFDM modulator 430 obtains K output symbols for the K total carriers in each symbol period. Each output symbol may be a data symbol, a pilot symbol, or a zero symbol. OFDM modulator 430 transforms the K output symbols for each symbol period with an inverse FFT (IFFT) or an inverse DFT (IDFT) to obtain a useful portion containing K time-domain chips. OFDM modulator 430 then copies the last G chips of the useful portion and appends these G chips to the front of the useful portion to form an OFDM symbol containing K+G chips. The repeated portion is referred to as a guard interval or a cyclic prefix and is used to combat intersymbol interference (ISI) caused by frequency selective fading. OFDM modulator 430 provides an OFDM symbol in each symbol period. A transmitter unit (TMTR) 432 receives and processes (e.g., converts to analog, amplifies, filters, and frequency upconverts) the OFDM symbols and generates a modulated signal, which is transmitted via an antenna 434.

At receiver 450, an antenna 452 receives the modulated signal from transmitter 410 and provides a received signal. A receiver unit (RCVR) 454 conditions (e.g., filters, amplifies, frequency downconverts, and digitizes) the received signal and provides input samples. An OFDM demodulator (Demod) 460 processes the input samples as described below to obtain K received symbols for the K total carriers in each symbol period. OFDM demodulator 460 derives channel gain estimates based on received pilot symbols, performs data demodulation on received data symbols with the channel gain estimates, and provides data symbol estimates. A receive (RX) data processor 470 then processes (e.g., deinterleaves and decodes) the data symbol estimates and provides decoded data. In general, the processing by OFDM demodulator 460 and RX data processor 470 is complementary to the processing by OFDM modulator 430 and TX data processor 420, respectively, at transmitter 410.

Controllers/processors 440 and 480 control the operation of various processing units at transmitter 410 and receiver 450, respectively. Memories 442 and 482 store data and program codes for transmitter 410 and receiver 450, respectively.

In one aspect, receiver 450 may perform post-FFT jammer detection and pre-FFT jammer suppression. Receiver 450 may perform post-FFT jammer detection before each data burst to be demodulated, without having to achieve time synchronization. This is possible because the color and audio carriers in an analog TV signal are continuous and appear as peaks in the FFT output even without time synchronization.

Prior to each data burst to be demodulated, receiver 450 may perform warm up and allow circuit blocks such as a low noise amplifier (LNA), analog and digital variable gain amplifiers (VGAs), a direct current (DC) loop, and an automatic gain control (AGC) loop to settle. Receiver 450 may then perform jammer detection before starting time synchronization.

For jammer detection, receiver 450 may capture M received OFDM symbols in M symbol periods, where in general M≧1. Receiver 450 may transform each received OFDM symbol with an FFT to obtain K received symbols for K total carriers, where K is dependent on the operating mode. The FFTs for the M received OFDM symbols may be performed based on an extended FFT mode having higher dynamic range for the received symbols than a normal FFT mode used during data demodulation. The extended FFT mode may use higher rounding between FFT stages, which may result in more truncation of the observed signal and hence shift the dynamic range of the frequency-domain symbols up, thereby leaving only few least significant bits (LSBs) occupied by the desired signal in case no jammers are present.

Receiver 450 may compute the power of each received symbol and average the power across the M symbol periods for each carrier, as follows:

$$P_R(k,n)=\alpha_R \cdot |R(k,n)|^2+(1-\alpha_R) \cdot P_R(k,n-1), \quad \text{Eq (1)}$$

where $R(k,n)$ is a complex received symbol on carrier k in symbol period n, $|R(k,n)|^2$ is the power of the received symbol on carrier k in symbol period n, $P_R(k,n)$ is an average power for carrier k in symbol period n, and $\alpha_R$ is a coefficient that determines the amount of averaging.

Equation (1) shows filtering based on an infinite impulse response (IIR) filter. Coefficient $\alpha_R$ may range from 0.0 to 1.0, with a small value of $\alpha_R$ corresponding to more averaging and a large value of $\alpha_R$ corresponding to less averaging. The filtering may also be performed based on a finite impulse response (FIR) filter or some other type of filter.

After filtering the power of the received symbols for all M symbol periods, receiver 450 may search for peaks among the K filtered values for the K total carriers. Receiver 450 may compare the filtered value for each peak against a detection threshold and may declare the presence of a jammer at that peak location if the filtered value exceeds the detection threshold, as follows:

$$\text{If } P_R(k,n)>P_{TH} \text{ then declare jammer on carrier k}, \quad \text{Eq (2)}$$

Else declare no jammer on carrier k, where $P_{TH}$ is the detection threshold. $P_{TH}$ may be an absolute value, a predetermined offset above an average power for all K total carriers, etc.

In one design, the frequency of each detected jammer is determined by the carrier index k for the corresponding peak. In this design, the resolution of the detected jammer frequency is determined by the FFT bin or carrier spacing, which is dependent on the operating mode. In another design, one or more (e.g., two) shoulder values are identified for each peak detected above the detection threshold. The peak and shoulder values as well as their carrier indices may be interpolated to obtain a detected jammer frequency with resolution better than the FFT bin spacing.

The interpolation may be based on various schemes. In one scheme, linear interpolation may be performed on a peak value and two shoulder values for two FFT bins adjacent to the peak. If the jammer frequency is at the center of the FFT bin of the peak, then the two shoulder values will be equal. However, if the jammer frequency is between the peak FFT bin and either the left or right shoulder FFT bin, then the left shoulder value will not be equal to the right shoulder value. A theoretical ratio of the two shoulder values may be determined for different frequency offsets from the peak FFT bin center and should resemble a sync function. An actual ratio of the left to right shoulder values may be determined and used to estimate the jammer frequency offset from the peak FFT bin center. In another scheme, Lagrange interpolation is used to determine the jammer frequency.

For any interpolation scheme, the frequency of each detected jammer may be determined by the whole carrier index k for the corresponding peak and a fractional value from the interpolation. Jammer frequency with resolution better than FFT bin spacing may be obtained with interpolation. For both designs noted above, the frequency of each detected jammer may be represented by an exponential value determined by the whole carrier index k and possibly the fractional value.

Receiver 450 may perform pre-FFT jammer suppression for all detected jammers using various types of filter commonly available in a receiver. In one design, receiver 450 performs jammer suppression using a narrowband notch filter that is commonly employed in a DC loop. The DC loop typically performs DC offset correction using the notch filter, which is tuned to zero frequency. This notch filter or a copy of this notch filter may be used to suppress the detected jammers. To suppress one detected jammer, receiver 450 may downconvert (i.e., frequency translate or rotate) the input samples by the detected jammer frequency, filter the downconverted samples with the notch filter, and upconvert the filtered samples by the detected jammer frequency. The downconversion may be achieved with simple rotation of the input samples before the notch filter, and the upconversion may be achieved with rotation back by the same amount after the notch filter. To suppress multiple detected jammers, receiver 450 may rotate the input samples by a first detected jammer frequency, then filter the samples with the notch filter, then rotate the samples to a second detected jammer frequency, then filter the samples with the notch filter, and so on, and finally rotate the samples back to the original frequency.

In another design, receiver 450 performs jammer suppression using a narrowband notch filter that is tuned to each detected jammer frequency. For this design, a rotator/multiplier may be used to tune the notch filter to any desired frequency. To suppress one detected jammer, the notch filter may be tuned to the detected jammer frequency and used to filter the input samples. To suppress multiple detected jammers, the notch filter may be tuned to a first detected jammer frequency, then used to filter the input samples, then tuned to a second detected jammer frequency, then used to filter the samples, etc. In this design, the input samples are not rotated.

In general, any number of notch filters may be used for jammer suppression, and each notch filter may be used to suppress any number of detected jammers. The input samples may be passed through all of the notch filters, which may be coupled in cascade or some other configuration.

Receiver 450 may perform jammer detection prior to each data burst and may enable or disable the notch filter(s) for jammer suppression depending on whether on not jammers are detected. In one design, a decision to enable or disable jammer suppression may be made independently for each data burst based on jammer detection results for that data burst. In another design, the decision to enable or disable jammer suppression may be made based on the jammer detection results for the current data burst and information for prior data bursts. For example, the notch filter(s) may be enabled for several data bursts after jammers are detected. This may allows for better probability of detection of jammer detection since the presence of jammers may be a relatively static condition in a broadcast environment. Variations of a wireless channel due to movements and multipath (of both the DVB-H signal and jammers) may affect jammer detection performance, but may be more dynamic and change in time faster around an average jammer power within the frequency channel.

Jammer detection may be performed prior to synchronization to detect for jammers and determine the frequency and possibly the level of each detected jammer. One or more notch filters may then be used to suppress all detected jammers. Synchronization tasks may be performed while the notch filter(s) are active, and any bias resulting from the presence of jammers may be removed. The suppression of jammers prior to performing synchronization may improve detection and acquisition performance as well as demodulation performance. Performing jammer detection prior to synchronization may also alleviate hardware requirements. Much of the hardware processing capability may be available for jammer detection prior to synchronization and may be used for data demodulation after synchronization.

In another aspect, receiver 450 may perform post-FFT jammer detection and post-FFT jammer suppression. Receiver 450 may perform post-FFT jammer detection before and/or during reception of data bursts to determine carriers with jammers. These jammers may be due to analog TV signals and may fall inband, as described above. Receiver 450 may then zero out or reduce the carriers with jammers to suppress these inband jammers. Any number of carriers and any set of carriers with jammers may be easily zeroed out or reduced.

For jammer detection, receiver 450 may transform each received OFDM symbol with an FFT to obtain K received symbols for the K total carriers. The FFT may be performed based on the normal FFT mode used during data demodulation. In one design, jammer detection may be performed for each carrier based on data power and channel power for that carrier. For this design, receiver 450 may derive channel gain estimates for the K total carriers based on received pilot symbols from the pilot cells.

Receiver 450 may compute the data power for each carrier k, as follows:

$$P_D(k,n) = \alpha_D \cdot |D(k,n)|^2 + (1-\alpha_D) \cdot P_D(k,n-1), \quad \text{Eq (3)}$$

where $D(k,n)$ is a complex received data symbol on carrier k in symbol period n, $P_D(k,n)$ is the data power for carrier k in symbol period n, and $\alpha_D$ is a coefficient that determines the amount of averaging for the data power.

Receiver 450 may compute the channel power for each carrier k, as follows:

$$P_H(k,n) = \alpha_H \cdot |H(k,n)|^2 + (1-\alpha_H) \cdot P_H(k,n-1), \quad \text{Eq (4)}$$

where $H(k,n)$ is a complex channel gain estimate for carrier k in symbol period n, $P_H(k,n)$ is the channel power for carrier k in symbol period n, and $\alpha_H$ is a coefficient that determines the amount of averaging for the channel power.

The channel gain estimates H(k,n) may be derived based on the received pilot symbols from the pilot cells. In each symbol period, initial channel gain estimates may be derived based on the received pilot symbols from the pilot cells in that symbol period. The initial channel gain estimates for pilot cells in one or more symbol periods may be processed (e.g., interpolated) to obtain the channel gain estimates for the K total carriers in each symbol period.

The IIR filters in equations (3) and (4) time average the data power and channel power, respectively. The filtering improves jammer detection performance since a carrier with jammer may have low power some of the time and higher power some other time, depending on whether the signal and jammer combine constructively or destructively. However, over time, a carrier with jammer will have higher than average power. Coefficients $\alpha_D$ and $\alpha_H$ may range from 0.0 to 1.0 and may be selected to achieve the desired amount of averaging. Coefficient $\alpha_D$ may or may not be equal to coefficient $\alpha_H$.

For each carrier k, the data power may be compared to the channel power. A jammer may be declared on carrier k if the data power is sufficiently higher than the channel power, as follows:

$$\text{If } P_D(k,n) > \beta_H \cdot P_H(k,n) \text{ then declare jammer on carrier } k, \quad \text{Eq (5)}$$

Else declare no jammer on carrier k,
where $\beta_H$ is a threshold multiplier for the channel power. $\beta_H$ may be selected based on computer simulation, empirical measurements, field testing, etc. For example, $\beta_H$ may be set to 5/3 (which is approximately 4.5 dB) or some other value.

In another design, jammer detection may be performed for each carrier based on data power and noise power for that carrier. For this design, receiver 450 may estimate the noise for each carrier k, as follows:

$$N(k,n) = |D(k,n) - \overline{D}(k,n)|^2, \quad \text{Eq (6)}$$

where $\overline{D}(k,n)$ is a hard decision for carrier k in symbol period n, and
N(k,n) is the noise for carrier k in symbol period n.
The noise N(k,n) may also be estimated in other manners.

Receiver 450 may filter the noise for each carrier k, as follows:

$$P_N(k,n) = \alpha_N \cdot N(k,n) + (1 - \alpha_N) \cdot P_N(k, n-1), \quad \text{Eq (7)}$$

where $P_N(k,n)$ is the noise power for carrier k in symbol period n, and
$\alpha_N$ is a coefficient that determines the amount of averaging for the noise power.

For each carrier k, the data power may be compared to the noise power. A jammer may be declared on carrier k if the data power is sufficiently higher than the noise power, as follows:

$$\text{If } P_D(k,n) > \beta_N \cdot P_N(k,n) \text{ then declare jammer on carrier } k, \quad \text{Eq (8)}$$

Else declare no jammer on carrier k,
where $\beta_N$ is a threshold multiplier for the noise power. $\beta_N$ may be selected based on computer simulation, empirical measurements, field testing, etc.

In other designs, the data power for each carrier may be compared to a scaled average power for the K total carriers, a predetermined value, or some other value. In general, a threshold value may be determined for each carrier (e.g., $\beta_H \cdot P_H(k,n)$ or $\beta_N \cdot P_N(k,n)$), for each set of carriers, or for all K total carriers.

For jammer suppression, each carrier with detected jammer may be modified in various manners. In one design, each carrier with jammer may be zeroed out by replacing the received data symbol for that carrier with a zero symbol (or simply, zero). Data demodulation may then be performed on the received data symbols for carriers without jammers and zero symbols for carriers with jammers. For example, log likelihood ratios (LLRs) may be computed for the code bits of each symbol. The LLR for each code bit indicates the likelihood of that code bit being '1' or '0'. The LLRs for the code bits for carriers with jammers may be set to zero to indicate equal likelihood of these code bits being '1' or '0'. The code bits with LLRs of zero may be given no weight in the decoding process, which may prevent jammers from degrading decoding performance. In another design, the LLRs for each carrier with jammer may be reduced (instead of set to zero) to indicate less certainty in the '0' or '1' values conveyed by these LLRs.

In one design, jammer detection and suppression may be performed for each of the D data carriers in each symbol period. The data carriers may change from symbol period to symbol period, as shown in FIG. 3B. In each symbol period, the data power and channel power may be updated for each of the K total carriers, as described above. However, jammer detection and suppression may be performed for the D data carriers and omitted for the P pilot carriers.

In another design, jammer detection and suppression may be performed for up to L carriers, where L may be a fixed value and may be equal to 512, 1024, 2048, or some other value. For example, if L=2048, then jammer detection and suppression may be performed for all carriers in DVB mode 1 and ISDB-T modes 1, 2, and 3 since all of these modes have less than 2048 carriers. In DVB modes 2 and 3, jammer detection and suppression may be performed for a subset of the K total carriers if L=2048. The L carriers may be distributed across the K total carriers or may be concentrated in regions where jammers are more likely to be present. This design may be used to reduce memory and power requirements.

In yet another design, jammer detection and suppression may be selectively performed for different frequency regions. The K total carriers may be partitioned into multiple (e.g., 16) regions. Each region may correspond to a set of contiguous carriers. Jammer detection and suppression may be enabled or disabled for each region. For example, jammer detection and suppression may be enabled for regions in which jammers are more likely to be present (e.g., regions covering color and audio carriers) and may be disabled for regions in which jammers are less likely or unlikely to be present.

Setting a carrier to zero effectively removes jammer as well as desired signal on that carrier. The effect of zeroing out carriers with jammers may be dependent on a code rate used by transmitter 410 for the data bursts received by receiver 450. A higher code rate generates less redundancy in the transmitted data, and zeroing out carriers with jammers may have more impact on decoding performance. The converse may be true for a lower code rate.

In general, jammer detection and suppression may be performed in various manners and based on various factors. In one design, jammer detection and suppression may be enabled and performed whenever receiving data, regardless of the code rate. In another design, jammer detection and suppression may be enabled for a predetermined code rate or lower, or when jammers are detected prior to synchronization, or based on some other condition or criteria, and may be disabled otherwise. In yet another design, jammer detection may be dependent on code rate and/or other factors. For example, a larger threshold multiplier $\beta_H$ or $\beta_N$ may be used for a higher code rate so that only jammers with larger amplitude are zeroed out, which may reduce impact due to zeroing out of the desired signal.

Receiver 450 may perform post-FFT jammer detection and pre-FFT jammer suppression, which is referred to as a first jammer detection and suppression scheme. Alternatively or additionally, receiver 450 may perform post-FFT jammer detection and post-FFT jammer suppression, which is referred to as a second jammer detection and suppression scheme. The first scheme may improve signal detection and acquisition performance as well as demodulation performance. The second scheme may be able to detect and suppress jammers at any number of carriers and any of the carriers and may improve demodulation performance. The first and second schemes may be performed independently of one another, so that either scheme or both schemes may be performed.

Figure 5:
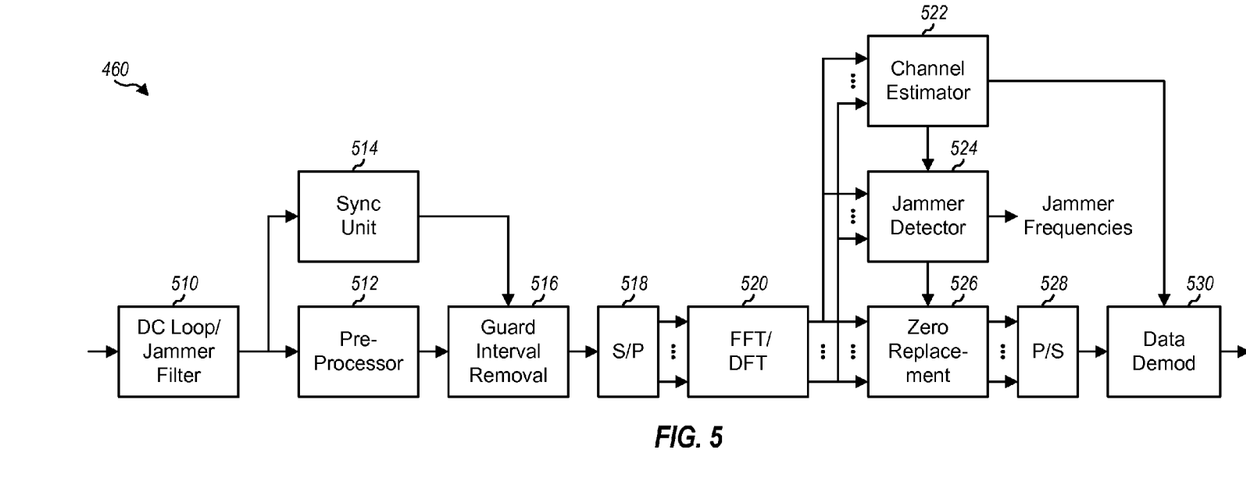
FIG. 5 shows a block diagram of an OFDM demodulator at the receiver.

FIG. 5 shows a block diagram of a design of OFDM demodulator 460 at receiver 450 in FIG. 4. Within OFDM demodulator 460, a unit 510 may perform DC offset removal and pre-FFT jammer suppression on the input samples, as described below. A pre-processor 512 processes the samples from unit 510 and provides received samples. Pre-processor 512 may perform AGC, timing acquisition, filtering, sample rate conversion, frequency error estimation and removal, and/or other functions. A synchronization (Sync) unit 514 performs time synchronization and generates an FFT window that indicates which samples to process for each received OFDM symbol.

A unit 516 removes the guard interval in each received OFDM symbol based on the FFT window from unit 514 and provides K received samples for that OFDM symbol. A serial-to-parallel converter (S/P) 518 provides the K received samples for each received OFDM symbol in parallel. A unit 520 performs an FFT/DFT on the K received samples to obtain K frequency-domain received symbols for the K total carriers. Unit 520 provides received pilot symbols from the P pilot carriers to a channel estimator 522, received data symbols from the D data carriers to a zero replacement unit 526, and received symbols from the K total carriers to a jammer detector 524. Channel estimator 522 derives channel gain estimates for the K total carriers based on the received pilot symbols.

For the first jammer detection and suppression scheme, jammer detector 524 may perform post-FFT jammer detection by (i) filtering the power of the received symbols for each carrier, e.g., as shown in equation (1), and (ii) comparing the power for each carrier against a detection threshold, e.g., as shown in equation (2). Jammer detector 524 may also determine the frequency of each detected jammer, which may be used for pre-FFT filtering to suppress the detected jammer.

For the second jammer detection and suppression scheme, jammer detector 524 may perform post-FFT jammer detection by (i) determining the data power and channel power for each carrier, e.g., as shown in equations (3) and (4), and (ii) comparing the data power to a scaled channel power, e.g., as shown in equation (5). Jammer detector 524 may also perform jammer detection in other manners, e.g., based on the data power and noise power. Jammer detector 524 may provide the carriers with detected jammers. Zero replacement unit 526 may zero out each carrier with jammer and pass each carrier without jammer.

A parallel-to-serial converter (P/S) 528 serializes the K symbols in each symbol period from unit 526. A data demodulator 530 performs data demodulation/detection on the received data symbols with the channel gain estimates and provides data symbol estimates, which may be given as LLRs or some other format. Data demodulator 530 may also reduce the LLRs for carriers with jammers.

Figure 6:
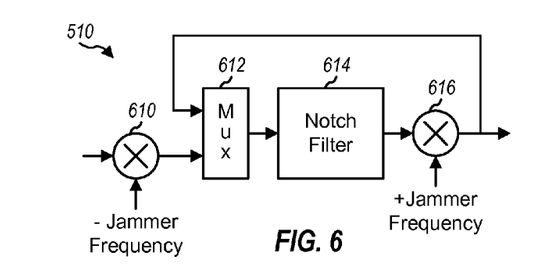
FIG. 6 shows a block diagram of a DC loop/jammer filter unit.

FIG. 6 shows a design of DC loop/jammer filter unit 510 in FIG. 5. Within unit 510, a multiplier/rotator 610 multiplies the input samples with a complex sinusoidal at a detected jammer frequency to center the detected jammer at zero frequency. A multiplexer (Mux) 612 selects the samples from multiplier 610 or 616 and provides the selected samples. A notch filter 614 filters the samples from multiplexer 612 to suppress the detected jammer. Multiplier 616 multiplies the filtered samples from notch filter 524 with a complex sinusoidal at a proper frequency and provides samples with jammers suppressed. To suppress a single detected jammer, multiplier 610 may translate the detected jammer to zero frequency, and multiplier 616 may translate the filtered samples back to the original frequency, as shown in FIG. 6. To suppress multiple detected jammers, multiplier 610 may translate the first detected jammer to zero frequency, and multiplier 616 may translate the filtered samples to the next detected jammer frequency or the original frequency (not shown in FIG. 6). Pre-FFT jammer suppression may also be performed by tuning notch filter 614 to each detected jammer frequency and omitting multipliers 610 and 616 from unit 510.

Figure 7:
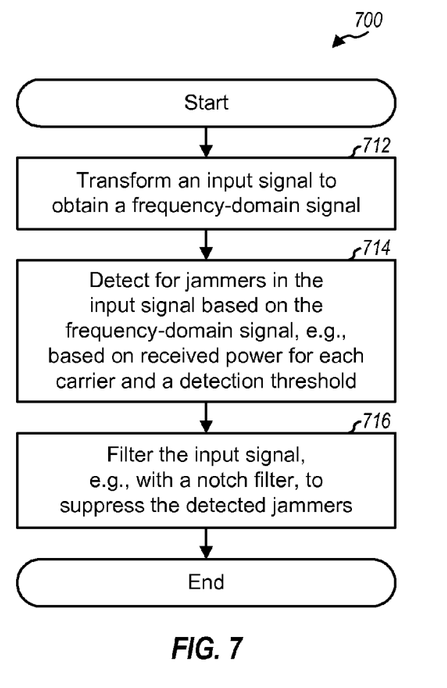
FIG. 7 shows a process for performing jammer detection and suppression.

FIG. 7 shows a design of a process 700 for performing jammer detection and suppression. An input signal may be transformed (e.g., with FFT or DFT) to obtain a frequency-domain signal (block 712). The input signal may correspond to the input samples provided to unit 510 in FIG. 5. The frequency-domain signal may correspond to the received symbols from FFT/DFT unit 520 in FIG. 5. The input signal may be transformed based on a first transform mode for jammer detection and based on a second transform mode for data demodulation. The first transform mode may have higher dynamic range than the second transform mode and may be better able to capture jammers.

Jammers in the input signal may be detected based on the frequency-domain signal (block 714). The powers of a plurality of carriers may be determined based on the frequency-domain signal. Jammers may then be detected based on peaks in the powers of the plurality of carriers. For example, a jammer may be declared if a peak exceeds a threshold. The threshold may be a fixed value or a configurable value, e.g., determined based on an average power for the plurality of carriers. The frequencies of the detected jammers may be determined based on the carriers of the peaks. Interpolation may also be performed on the peaks and their shoulders to determine the frequencies of the detected jammers. The input signal may comprise time-sliced data bursts, e.g., as shown in FIG. 3A, and jammers may be detected prior to each data burst to be demodulated.

The input signal may be filtered to suppress the detected jammers (block 716). For one detected jammer, the input signal may be downconverted by the detected jammer frequency, then filtered to suppress the detected jammer, and then upconverted by the detected jammer frequency. For multiple detected jammers, the input signal may be frequency translated to center a first jammer at a designated frequency (e.g., zero frequency), then filtered to suppress the first jammer, then frequency translated to center a second jammer at the designated frequency, then filtered to suppress the second jammer, etc. Alternatively, the input signal may be filtered based on a notch filter tuned to each detected jammer frequency. Filtering of the input signal may be enabled when jammers are detected and disabled when jammers are not detected.

Figure 8:
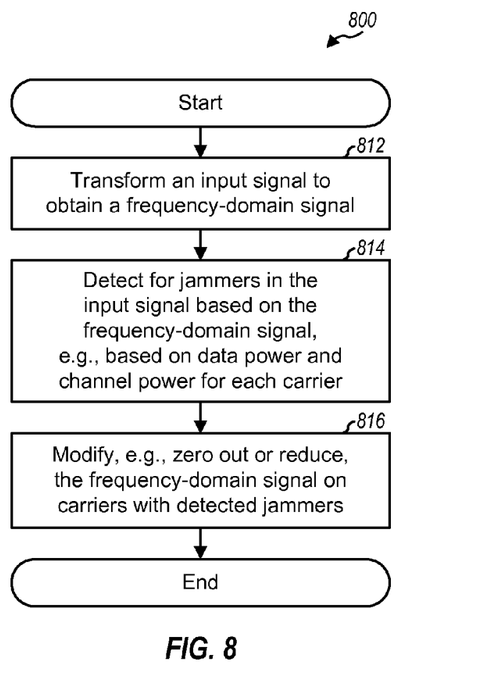
FIG. 8 shows another process for performing jammer detection and suppression.

FIG. 8 shows a design of a process 800 for performing jammer detection and suppression. An input signal may be transformed (e.g., with FFT or DFT) to obtain a frequency-domain signal (block 812). Jammers in the input signal may be detected based on the frequency-domain signal (block 814). In one design, data power and channel power for each of a plurality of carriers may be determined, e.g., as shown in equations (3) and (4). Whether jammer is present on each carrier may be determined based on the data power and channel power for that carrier. For example, jammer may be declared if the data power exceeds the channel power by a predetermined amount, e.g., as shown in equation (5). In another design, data power and noise power for each of the plurality of carriers may be determined, e.g., as shown in equations (3), (6) and (7). Whether jammer is present on each carrier may be determined based on the data power and noise power for that carrier, e.g., as shown in equation (8). Jammer detection may also be performed in other manners, e.g., by comparing the data power for each carrier against a fixed value or a configurable value, which may be a scaled average power for all carriers. The frequency-domain signal may be modified (e.g., zeroed out or reduced) on carriers with detected jammers (block 816).

The techniques described herein may be implemented by various means. For example, these techniques may be implemented in hardware, firmware, software, or a combination thereof. For a hardware implementation, the processing units used to perform jammer detection and suppression may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software codes may be stored in a memory (e.g., memory 482 in FIG. 4) and executed by a processor (e.g., processor 480). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
at least one processor configured to transform an input signal to obtain a frequency-domain signal, to detect for jammers in the input signal based on the frequency-domain signal, and to filter the input signal to suppress the detected jammers; and
a memory coupled to the at least one processor;
wherein the at least one processor is configured to determine powers of a plurality of carriers based on the frequency-domain signal, and detect for jammers based on peaks in the powers of the plurality of carriers.

2. The apparatus of claim 1, wherein the at least one processor is configured to downconvert the input signal by a detected jammer frequency, to filter the downconverted input signal to suppress a jammer at the detected jammer frequency and obtain a filtered signal, and to upconvert the filtered signal by the detected jammer frequency.

3. The apparatus of claim 1, wherein the at least one processor is configured to frequency translate the input signal, to filter the frequency translated input signal to suppress a first jammer at a first frequency and obtain a first filtered signal, to frequency translate the first filtered signal, to filter the frequency translated first filtered signal to suppress a second jammer at a second frequency and obtain a second filtered signal, and to frequency translate the second filtered signal.

4. The apparatus of claim 1, wherein the at least one processor is configured to filter the input signal based on a notch filter tuned to a detected jammer frequency.

5. The apparatus of claim 1, wherein the at least one processor is configured to transform the input signal based on a first transform mode for jammer detection, and to transform the input signal based on a second transform mode for data demodulation, the first transform mode having higher dynamic range than the second transform mode.

6. The apparatus of claim 1, wherein the at least one processor is configured to declare a jammer for each peak exceeding a threshold.

7. The apparatus of claim 6, wherein the at least one processor is configured to determine the threshold based on average power for the plurality of carriers.

8. The apparatus of claim 1, wherein the at least one processor is configured to determine frequencies of the detected jammers based on carriers of the peaks.

9. The apparatus of claim 1, wherein the at least one processor is configured to perform interpolation on the peaks and shoulders of the peaks to determine frequencies of the detected jammers.

10. The apparatus of claim 1, wherein the input signal comprises data bursts, wherein the at least one processor is configured to detect for jammers prior to each data burst to be demodulated.

11. The apparatus of claim 1, wherein the at least one processor is configured to enable filtering of the input signal when jammers are detected and to disable filtering of the input signal when jammers are not detected.

12. A method comprising:
transforming an input signal to obtain a frequency-domain signal;
detecting for jammers in the input signal based on the frequency-domain signal; and
filtering the input signal to suppress the detected jammers;
wherein detecting for jammers in the input signal comprises:
determining powers of a plurality of carriers based on the frequency-domain signal, and
detecting for jammers based on peaks in the powers of the plurality of carriers.

13. The method of claim 12, wherein the filtering the input signal to suppress the detected jammers comprises filtering the input signal with a notch filter to suppress the detected jammers.

14. An apparatus comprising:
means for transforming an input signal to obtain a frequency-domain signal;
means for detecting for jammers in the input signal based on the frequency-domain signal; and
means for filtering the input signal to suppress the detected jammers;
wherein the means for detecting for jammers in the input signal comprises:
means for determining powers of a plurality of carriers based on the frequency-domain signal, and means for detecting for jammers based on peaks in the powers of the plurality of carriers.

15. The apparatus of claim 14, wherein the means for filtering the input signal to suppress the detected jammers comprises means for filtering the input signal with a notch filter to suppress the detected jammers.

16. An apparatus comprising:
at least one processor configured to transform an input signal to obtain a frequency-domain signal, to detect for jammers in the input signal based on the frequency-domain signal, and to modify the frequency-domain signal on carriers with detected jammers; and
a memory coupled to the at least one processor;
wherein the at least one processor is configured to determine powers of a plurality of carriers based on the frequency-domain signal, and detect for jammers based on peaks in the bowers of the plurality of carriers.

17. The apparatus of claim 16, wherein the at least one processor is configured to zero out the frequency-domain signal on each carrier with a detected jammer.

18. The apparatus of claim 16, wherein the at least one processor is configured to reduce the frequency-domain signal on each carrier with a detected jammer.

19. The apparatus of claim 16, wherein the at least one processor is configured to reduce log likelihood ratios (LLRs) for each carrier with a detected jammer.

20. The apparatus of claim 16, wherein the at least one processor is configured to determine data power for each of a plurality of carriers, to determine channel power for each of the plurality of carriers, and to determine whether jammer is present on each of the plurality of carriers based on the data power and the channel power for the carrier.

21. The apparatus of claim 20, wherein the at least one processor is configured to declare a jammer if the data power exceeds the channel power by a predetermined amount.

22. The apparatus of claim 20, wherein the at least one processor is configured to obtain received symbols for the plurality of carriers in multiple symbol periods, and to filter power of received symbols for each carrier across the multiple symbol periods to obtain the data power for the carrier.

23. The apparatus of claim 20, wherein the at least one processor is configured to derive channel gain estimates for the plurality of carriers in multiple symbol periods, and to filter power of channel gain estimates for each carrier across the multiple symbol periods to obtain the channel power for the carrier.

24. The apparatus of claim 16, wherein the at least one processor is configured to determine data power for each of a plurality of carriers, to determine noise power for each of the plurality of carriers, and to determine whether jammer is present on each of the plurality of carriers based on the data power and the noise power for the carrier.

25. The apparatus of claim 16, wherein the at least one processor is configured to determine whether or not to perform jammer detection and suppression based on a code rate used for transmitted data.

26. A method comprising:
transforming an input signal to obtain a frequency-domain signal;
detecting for jammers in the input signal based on the frequency-domain signal; and
modifying the frequency-domain signal on carriers with detected jammers;
wherein detecting for jammers in the input signal comprises:
determining powers of a plurality of carriers based on the frequency-domain signal; and
detecting for jammers based on peaks in the powers of the plurality of carriers.

27. The method of claim 26, wherein the detecting for jammers in the input signal comprises
determining data power for each of a plurality of carriers,
determining channel power for each of the plurality of carriers, and
determining whether jammer is present on each of the plurality of carriers based on the data power and the channel power for the carrier.

28. The method of claim 26, wherein the modifying the frequency-domain signal comprises zeroing out the frequency-domain signal on each carrier with a detected jammer.

29. An apparatus comprising:
means for transforming an input signal to obtain a frequency-domain signal;
means for detecting for jammers in the input signal based on the frequency-domain signal; and
means for modifying the frequency-domain signal on carriers with detected jammers;
wherein the means for detecting for jammers in the input signal comprises:
means for determining powers of a plurality of carriers based on the frequency-domain signal; and
means for detecting for jammers based on peaks in the powers of the plurality of carriers.

30. The apparatus of claim 29, wherein the means for detecting for jammers in the input signal comprises
means for determining data power for each of a plurality of carriers,
means for determining channel power for each of the plurality of carriers, and
means for determining whether jammer is present on each of the plurality of carriers based on the data power and the channel power for the carrier.

31. The apparatus of claim 29, wherein the means for modifying the frequency-domain signal comprises means for zeroing out the frequency-domain signal on each carrier with a detected jammer.

32. An electronic device having a computer readable program code embodied therein, said computer readable program code adapted to be executed to implement a method comprising:
transforming an input signal to obtain a frequency-domain signal;
detecting for jammers in the input signal based on the frequency-domain signal; and
filtering the input signal to suppress the detected jammers;
wherein detecting for jammers in the input signal comprises:
determining powers of a plurality of carriers based on the frequency-domain signal; and
detecting for jammers based on peaks in the powers of the plurality of carriers.

33. An electronic device having a computer readable program code embodied therein, said computer readable program code adapted to be executed to implement a method comprising:
transforming an input signal to obtain a frequency-domain signal;
detecting for jammers in the input signal based on the frequency-domain signal; and
modifying the frequency-domain signal on carriers with detected jammers;
wherein detecting for jammers in the input signal comprises:
determining powers of a plurality of carriers based on the frequency-domain signal; and
detecting for jammers based on peaks in the powers of the plurality of carriers.

* * * * *